June 19, 1934.     J. W. INGISON     1,963,367
WATER HEATING DEVICE

Original Filed Aug. 25, 1930    2 Sheets-Sheet 1

Inventor:
J. W. Ingison.
By Whiteley and Ruckman
Attorneys.

June 19, 1934.  J. W. INGISON  1,963,367
WATER HEATING DEVICE
Original Filed Aug. 25, 1930  2 Sheets-Sheet 2

Inventor:
J. W. Ingison.
By Whiteley and Ruckman
Attorneys.

Patented June 19, 1934

1,963,367

UNITED STATES PATENT OFFICE 1,963,367

WATER HEATING DEVICE

Jay W. Ingison, Minneapolis, Minn.

Application August 25, 1930, Serial No. 477,613
Renewed October 28, 1933

8 Claims. (Cl. 219—39)

My invention relates to water heating devices. It relates more particularly to devices for heating water for use in hot water radiator systems for buildings and for heating water for domestic and culinary purposes. An object of the invention is to provide a device of this character embodying heating means for the water in combination with means whereby heat is stored up in the device when the heating means is in operation and this stored up heat is delivered for use in heating the water when the heating means is cut off or out of operation. While the employment of any suitable means such as gas is within the purview of my invention broadly considered, I contemplate more particularly the employment of electric heating elements for heating the water. When such heating means is employed, the device operates to store up reserve heat when the current is on during the time of over supply thereof when it can be had at a special low rate. During the time of peak-load, the current is cut off and the stored up heat is employed to keep in heated condition the water which is utilized at such time.

The full objects and advantages of my invention will appear in connection with the detailed description thereof, and the novel features of my inventive idea will be particularly pointed out in the claims.

In the accompanying drawings which illustrate a practical embodiment of my invention,—

Figure 1:
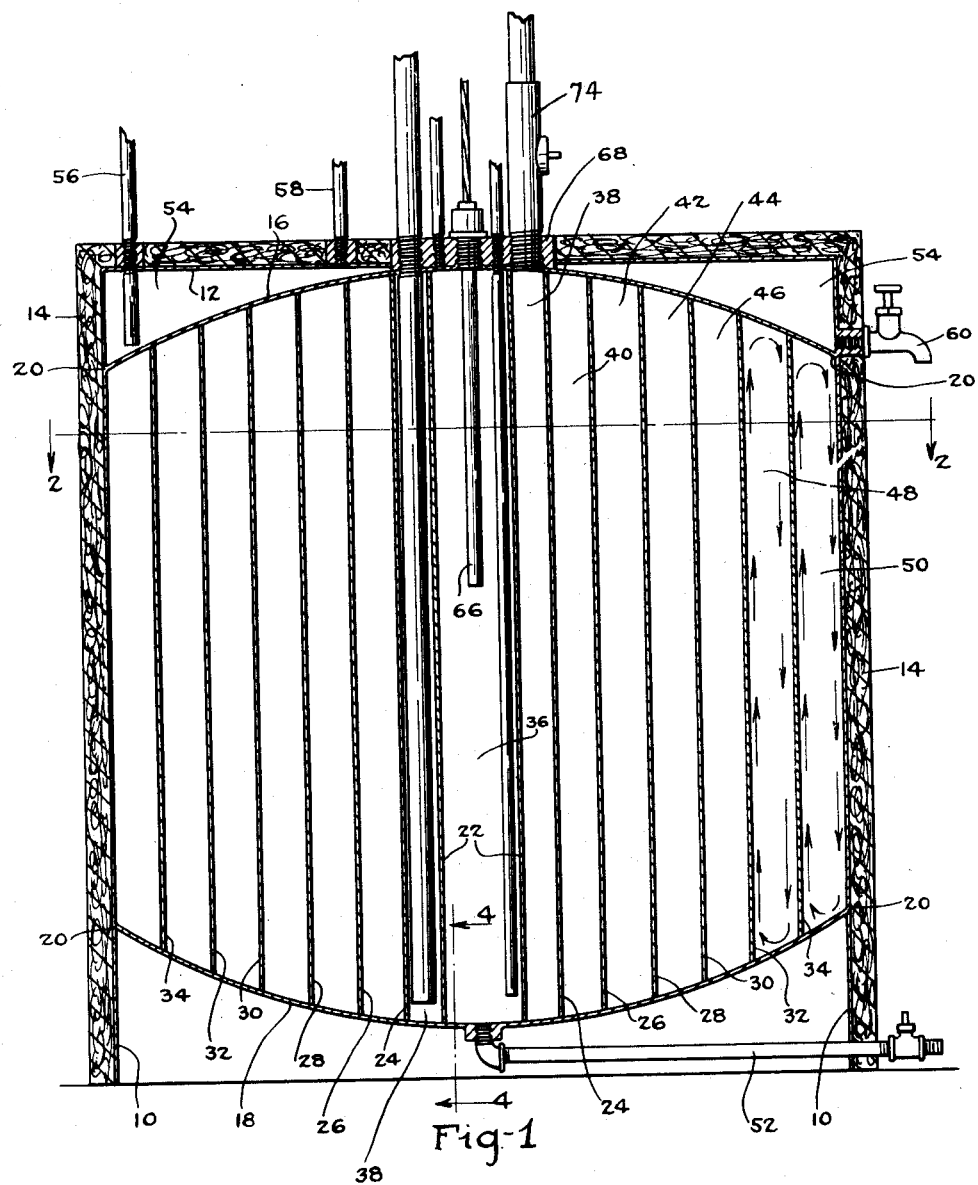
Figure 2:
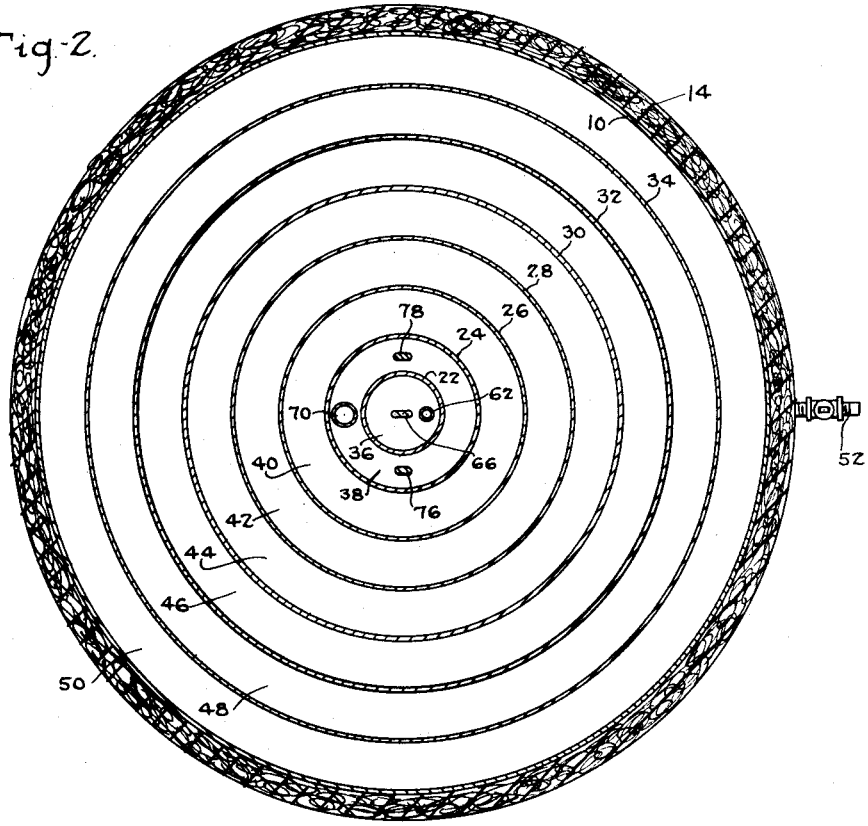
Figure 3:
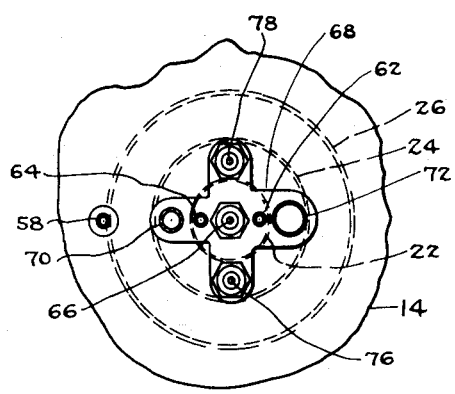
Figure 4:
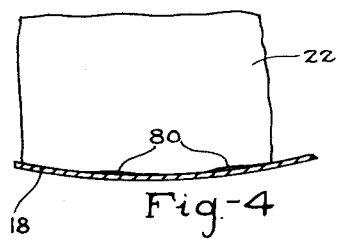

Fig. 1 is a view of the device mostly in vertical section and with some of the parts in elevation. Fig. 2 is a view in horizontal section on the line 2—2 of Fig. 1. Fig. 3 is a fragmentary plan view of the central portion of the top of the device. Fig. 4 is a detail view in section on the line 4—4 of Fig. 1.

Referring to the particular construction shown in the drawings, the numeral 10 designates a sheet metal shell preferably of cylindrical shape and which is open at the bottom and closed at the upper end by a horizontal top member 12. The shell 10 including its flat top member 12 is covered with heat insulating material 14. Within the shell there is a sheet metal boiler having an upper convex head 16 and a lower convex head 18, these heads at their margins being secured to the inner surface of the shell 10 by welding or other suitable manner as indicated at 20. Before the heads 16 and 18 are secured in place, a plurality of vertically disposed sheet metal cylinders are placed in the boiler, there being seven of these cylinders in the embodiment shown designated by the numerals 22, 24, 26, 28, 30, 32 and 34. These cylinders are concentrically arranged, the cylinder 22 being the central one and the cylinder 34 being the outermost one, with the other cylinders arranged in order therebetween so that eight concentric compartments 36, 38, 40, 42, 44, 46, 48 and 50 are produced, these compartments with the exception of the central one 36 being annular. The lower convex head 18 is set up far enough in the shell 10 to provide for a drain pipe 52 which leads from the central compartment 36. The upper convex head 16 has its central outwardly bulged portion in contact with the top shell member 12 and forms therewith a watertight annular compartment 54 in the upper portion of the boiler. An intake pipe 56 leads into the lower portion of this compartment while a discharge pipe 58 leads from the upper portion of this compartment. The intake pipe 56 is intended to supply spring or artesian water for culinary use, this water being heated in the compartment 54 and delivered through the pipe 58 to the desired place of use. The lower portion of the compartment 54 is provided with a drain cock 60.

An inlet pipe 62 for water from any suitable source such as the customary city water supply leads into the lower portion of the central compartment 36 while a discharge pipe 64 leads from the upper portion thereof for delivering the heated water for laundry, bath, kitchen and general domestic purposes. An electric heating element 66 supplied with current from any suitable source is held by a head member 68 mounted on the top of the device and this heating element extends down into the central compartment 36. A return or intake pipe 70 connected with the hot water radiator system of the building extends into the lower portion of the adjacent or second compartment 38 while a supply pipe 72 for said system leads from the top of this compartment. A hydrostat of well known construction placed in the attaching nipple 74 of the supply pipe 72 controls the electricity which is supplied to the heating element 66 and to two similar heating elements 76 and 78 which extend down into the second compartment 38. The positioning of these heating elements will be understood from Figs. 2 and 3. It will also be understood that a customary thermostat placed in a room of the building to be heated, controls the temperature of the air whereby a double automatic electric control is provided.

The operation and advantages of my invention will now be understood in connection with the foregoing description. By referring to Fig. 4, it will be understood that the various cylinders such as 22, etc., do not fit upon the heads 16 and 18 in airtight and watertight manner but there are small gaps indicated at 80 between the heads and the margins of the cylinders. These gaps provide for the inward movement and escape of air at the top and for the inward movement and escape of sediment at the bottom. Furthermore, the gaps 80 insure that the various compartments will be kept filled with water supplied by the inlet pipe 62. It will be understood that the upper compartment 54 may be dispensed with in case the city water supplied by the pipe 62 is considered sufficiently safe and sanitary for culinary use. From the preceding description, it will be understood that the central compartment 36 is pipe to receive and deliver water in sufficient quantity to insure almost instantaneous hot water for laundry, bath, kitchen and general domestic purposes including culinary use if the city water is considered suitable for such last mentioned use. The second compartment 38 is piped to and from the hot water radiators throughout the building and this compartment is provided with a sufficient number of electric heating elements (shown in the drawings as two in number) to insure rapid circulation of hot water to and from the radiators. The remaining compartments outside of the compartment 38 are designed for storage of heat which gradually decreases in intensity from the central portion to the circumference, each successive cylinder breaking the heat waves and checking the movement of water so as to cause a separate local circulation confined to each compartment as indicated by the arrows in Fig. 1 in connection with the two outer compartments. This system may therefore be referred to as a "correlating system". The electric heating elements operate directly upon only a small percentage of the water, thereby insuring quicker action while the remainder of the water contained in the outer compartments furnishes a dependable storage of heat sufficient to cause hot water to be supplied from the two inner compartments for several hours at a time especially when the electric current is cut off during the time of peak-load. Heat is restored to the water in the outer compartments during the time of over-supply of current when the current can be had at a special low rate through a separate meter installed for such purpose.

I claim:

1. A water heating device comprising a plurality of concentrically arranged compartments for containing water, inlet and discharge pipes for the central one of said compartments, said inlet pipe being adapted for connection with a source of water supply and said discharge pipe being adapted to deliver water for domestic purposes, inlet and discharge pipes for the adjacent one of said compartments, said last mentioned pipes being adapted for attachment to a hot water radiator system, and means for supplying heat to said central and adjacent compartments, the remainder of said compartments serving to store heat when said heating means is in operation and to give up heat for heating the water delivered by the discharge pipes when said heating means is cut off.

2. A water heating device comprising a plurality of concentrically arranged compartments for containing water, inlet and discharge pipes for the central one of said compartments, said inlet pipe being adapted for connection with a source of water supply and said discharge pipe being adapted to deliver water for domestic purposes, inlet and discharge pipes for the adjacent one of said compartments, said last mentioned pipes being adapted for attachment to a hot water radiator system, and an electric heating device for supplying heat to said central and adjacent compartments, the remainder of said compartments serving to store heat when current is supplied to said heating device and to give up heat for heating the water delivered by the discharge pipes when current is cut off from said heating device.

3. A water heating device comprising a sheet metal shell, upper and lower convex heads whose margins are secured to the inner surface of said shell, a plurality of vertically disposed concentric cylinders between said heads which provide concentrically arranged compartments for containing water, inlet and discharge pipes for the central one of said compartments, said inlet pipe being adapted for connection with a source of water supply and said discharge pipe being adapted to deliver water for domestic purposes, inlet and discharge pipes for the adjacent one of said compartments, said last mentioned pipes being adapted for attachment to a hot water radiator system, and means for supplying heat to said central and adjacent compartments, the remainder of said compartments serving to store heat when said heating means is in operation and to give up heat for heating the water delivered by the discharge pipes when said heating means is cut off.

4. A water heating device comprising a sheet metal shell, upper and lower convex heads whose margins are secured to the innersurface of said shell, a plurality of vertically disposed concentric cylinders between said heads which provide concentrically arranged compartments for containing water, inlet and discharge pipes for the central one of said compartments, said inlet pipe being adapted for connection with a source of water supply and said discharge pipe being adapted to deliver water for domestic purposes, inlet and discharge pipes for the adjacent one of said compartments, said last mentioned pipes being adapted for attachment to a hot water radiator system, and an electric heating device for supplying heat to said central and adjacent compartments, the remainder of said compartments serving to store heat when current is supplied to said heating device and to give up heat for heating the water delivered by the discharge pipes when current is cut off from said heating device.

5. A water heating device comprising a vertically disposed cylindrical sheet metal shell, a horizontal top member for said shell, upper and lower convex heads whose margins are secured to the inner surface of said shell, said top member and upper convex head forming an upper compartment for water between the same, inlet and discharge pipes for said upper compartment, a plurality of vertically disposed concentric cylinders between said upper and lower heads which provide concentrically arranged compartments for containing water, inlet and discharge pipes for the central one of said compartments, said inlet pipe being adapted for connection with a source of water supply and said discharge pipe being adapted to deliver water for domestic purposes, inlet and discharge pipes for the adjacent one of said compartments, said last mentioned pipes being adapted for attachment to a hot water radiator system, an electric heating element in said central compartment, and electric heating elements in said adjacent compartment, the remainder of said compartments serving to store heat when current is supplied to said heating elements, and to give up heat for heating the water delivered by the discharge pipes when current is cut off from said heating elements.

6. A water heating device for supplying hot water radiator systems of buildings comprising a plurality of compartments for containing water disposed around each other in succession from the innermost one to the outermost one, means for supplying heat to one of the inner compartments, and supply and return pipes for the radiator system connected with one of the inner compartments, the outer ones of said compartments serving to store up heat when said heating means is in operation, and thereby heat the water for the radiator system when said heating means is cut off.

7. A water heating device for supplying hot water radiator systems of buildings comprising a plurality of compartments for containing water disposed around each other in succession from the innermost one to the outermost one, an electric heating device for supplying heat to one of the inner compartments, and supply and return pipes for the radiator system connected with one of the inner compartments, the outer ones of said compartments serving to store up heat when current is supplied to said heating device and thereby heat the water for the radiator system when current is cut off from said heating device.

8. A water heating device for supplying hot water radiator systems of buildings comprising a plurality of concentrically arranged compartments for containing water, an electric heating device for supplying heat adjacent the center of said compartments, and supply and return pipes for the radiator system connected adjacent the center of said compartments the outer ones of said compartments serving to store up heat when current is supplied to said heating device and thereby heat the water for the radiator system when current is cut off from said heating device.

JAY W. INGISON.